(12) United States Patent
Chen et al.

(10) Patent No.: US 9,274,626 B2
(45) Date of Patent: Mar. 1, 2016

(54) DISPLAY APPARATUS

(75) Inventors: Shih-Ting Chen, Hsin-Chu (TW);
Te-Hen Lo, Hsin-Chu (TW); Hao-Liang Chao, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 573 days.

(21) Appl. No.: 13/456,393

(22) Filed: Apr. 26, 2012

(65) Prior Publication Data

US 2013/0127743 A1 May 23, 2013

(30) Foreign Application Priority Data

Nov. 17, 2011 (TW) .............................. 100142065 A (51) Int. Cl.
*G06F 3/041* (2006.01)
*G02F 1/1333* (2006.01)

(52) U.S. Cl.
CPC ............ *G06F 3/041* (2013.01); *G02F 1/13338* (2013.01); *G02F 1/133308* (2013.01); *G06F 2203/04103* (2013.01)

(58) Field of Classification Search
CPC ................................................ G02F 1/133308
USPC .......................................................... 349/12
See application file for complete search history.

(56) References Cited

U.S. PATENT DOCUMENTS

| 6,016,134 | A * | 1/2000 | Ota ................................ 345/104 |
| 8,500,292 | B2 | 8/2013 | Lo et al. |
| 2003/0174128 | A1 * | 9/2003 | Matsufusa ..................... 345/205 |
| 2005/0151894 | A1 * | 7/2005 | Katsuda et al. ................. 349/58 |
| 2008/0137272 | A1 | 6/2008 | Cheng et al. |
| 2009/0011197 | A1 * | 1/2009 | Matsuhira ...................... 428/192 |
| 2009/0262554 | A1 * | 10/2009 | Lee et al. ....................... 362/633 |
| 2010/0246163 | A1 | 9/2010 | Chen et al. |
| 2010/0309102 | A1 * | 12/2010 | Jung ............................... 345/82 |
| 2011/0052839 | A1 * | 3/2011 | Pierce et al. ..................... 428/31 |
| 2011/0260338 | A1 * | 10/2011 | Lee et al. ....................... 257/778 |
| 2013/0154085 | A1 * | 6/2013 | Choi et al. .................... 257/720 |

FOREIGN PATENT DOCUMENTS

| CN | 101183285 A | 5/2008 |
| CN | 201594246 U | 9/2010 |
| CN | 102063840 | 5/2011 |
| TW | 594204 | 6/2004 |
| TW | 200720795 | 6/2007 |
| TW | 200738046 | 10/2007 |
| TW | 200919013 | 5/2009 |
| TW | 201123115 | 7/2011 |
| TW | 201133088 | 10/2011 |

* cited by examiner

*Primary Examiner* — Edward Glick
*Assistant Examiner* — Alexander Gross
(74) *Attorney, Agent, or Firm* — WPAT, P.C.; Justin King; Douglas A. Hosack (57) ABSTRACT

A display apparatus includes a panel module, an assembly member, a glue layer, and a touch module. The assembly member is engaged with a sidewall of the panel module. The glue layer is disposed on the panel module and at least one portion of the glue layer is disposed on the assembly member. The touch module is disposed on the glue layer. The panel module and the assembly member are adhered to a first side of the glue layer. The touch module is adhered to a second side of the glue layer opposite to the first side.

10 Claims, 6 Drawing Sheets

DISPLAY APPARATUS

RELATED APPLICATIONS

This application claims priority to Taiwan Application Serial Number 100142065, filed Nov. 17, 2011, which is herein incorporated by reference.

BACKGROUND

1. Field of Invention

The present invention relates to a display apparatus.

2. Description of Related Art

In recent years, owing to the rapid development of the electronics industry and the information industry, the related products also become increasingly sophisticated. For the current personal computers, in addition to seeking more rapid and more powerful computing units and a wide range of peripheral equipments to meet user needs, compact sized portable computers are the key development area of the industry.

For example, liquid crystal displays have advantages such as high definition, small size, light weight, low driving voltage, low power consumption, and a wide range of applications, and thus can be widely applied in portable televisions, mobile phones, camcorders, notebook computers, desktop monitors, and other consumer electronics products and become the mainstream of the displays.

A backlight module is one of key components used in a liquid crystal display (LCD). Since the panel module used in the liquid crystal display does not have the capability of emitting light, the function of the backlight module is provide a light source with sufficient brightness and uniform distribution for enabling the liquid crystal display to display an image normally. Nowadays, the liquid crystal display is widely used in an electronic product with growth potential such as a monitor, a notebook computer, a digital camera, a projector, thus continuously growing the demands of backlight module and its related components.

In general, during the process of assembling a panel module and a backlight module of a conventional liquid crystal display, a cell tape of which both sides are adhesive is adhered to an upper polarizer on a top portion of the panel module and an exterior wall of a frame of the backlight module, thereby attaching the panel module to the backlight module. As to a small or medium sized liquid crystal display, the panel module therein has a relatively large width and the backlight module therein has a relatively smaller thickness. Therefore, in order to enhance the capability of resisting the peeling force between the panel module and the backlight module under test, a direct gluing method is used to replace the cell tape adhering method in the design of fixing the panel module to the backlight module.

However, during the process of directly bonding a touch module to a panel module for a display apparatus, a glue layer applied between the touch module and the panel module usually results in overflow glue due to compression, thus further affecting the light-emitting quality of the display apparatus. Therefore, when the overflow glue is drained to the cell tape used for bonding the panel module to a backlight module for the display apparatus, an assembly personnel usually removes the overflow glue by manually scraping or repeatedly wiping with alcohol. However, the foregoing approaches seriously decrease the adhering strength of the cell tape, thus causing the panel module and the backlight module to be separated from each other easily. Furthermore, because the cell tape is opaque, the overflow glue cannot be cured due to failing to expose to curing light, thus exacerbating the overflow glue problem. Accordingly, many in the industry are endeavoring to develop techniques that effectively prevent the overflow glue problem during the process of directly bonding the touch module and the panel module of the display apparatus.

SUMMARY

In order to solve the problems of the prior art, the invention provides an improved display apparatus. A specifically designed assembly member firstly assembles with a panel module of the display apparatus is mainly used to provide assistance when the panel module is directly bonded to a touch module and assembled to a backlight module of the display apparatus. Particularly, the assembly member of the invention has a design of preventing overflow glue problem and a design of expelling air. Therefore, when the panel module accompanying with the assembly member is directly bonded to the touch module, the overflow glue problem caused by a glue layer compressed between the panel module and the touch module can be controlled, such that the lighting performance of the display apparatus is not affected. Furthermore, hooks are designed at an outer edge of the assembly member in the invention, and thus the panel module can be assembled to a frame of the backlight module by engaging the hooks with the frame. Accordingly, the conventional approach of mounting the panel module and the backlight module by a cell tape can be replaced.

According to an embodiment of the invention, a display apparatus includes a panel module, an assembly member, a glue layer, and a touch module. The assembly member is engaged with a sidewall of the panel module. The glue layer is disposed on the panel module and at least one portion of the glue layer is disposed on the assembly member. The touch module is disposed on the glue layer. The panel module and the assembly member are adhered to a first side of the glue layer. The touch module is adhered to a second side of the glue layer opposite to the first side.

In an embodiment of the invention, the assembly member further includes an engaging body and an adhering portion. The engaging body is engaged with the sidewall of the panel module. The adhering portion extends from the engaging body to an area between the touch module and the panel module. At least one portion of the adhering portion of the assembly member is adhered to the first side of the glue layer.

In an embodiment of the invention, the panel module further includes a substrate assembly and a polarizer. The engaging body is engaged with the sidewall of the substrate assembly. The polarizer is laminated on the substrate assembly. The adhering portion resists against an outer edge of the polarizer, and the polarizer of the panel module is adhered to the first side of the glue layer.

In an embodiment of the invention, the adhering portion and the polarizer substantially have the same thickness.

In an embodiment of the invention, the adhering portion further includes at least one recess.

In an embodiment of the invention, the touch module further includes a cover plate and a touch-sensing layer. The touch-sensing layer is disposed under the cover plate. The touch-sensing layer of the touch module is adhered to the second side of the glue layer.

In an embodiment of the invention, the recess is substantially aligned with the edge of the touch-sensing layer.

In an embodiment of the invention, the display apparatus further includes a frame. The frame includes at least one lock portion. The assembly member includes at least one hook. The lock portion and the hook are engaged with each other.

In an embodiment of the invention, the display apparatus further includes a frame and a bezel. The bezel is assembled with an interior wall of the frame. The panel module and the assembly member are mounted on the bezel.

In an embodiment of the invention, the display apparatus further includes a backlight module. The backlight module is mounted on the frame. The bezel surrounds the sidewall of the backlight module. The backlight module is located between the panel module and the frame.

In an embodiment of the invention, the assembly member is mounted to the interior wall of the frame.

In an embodiment of the invention, the assembly member is a light-pervious element.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
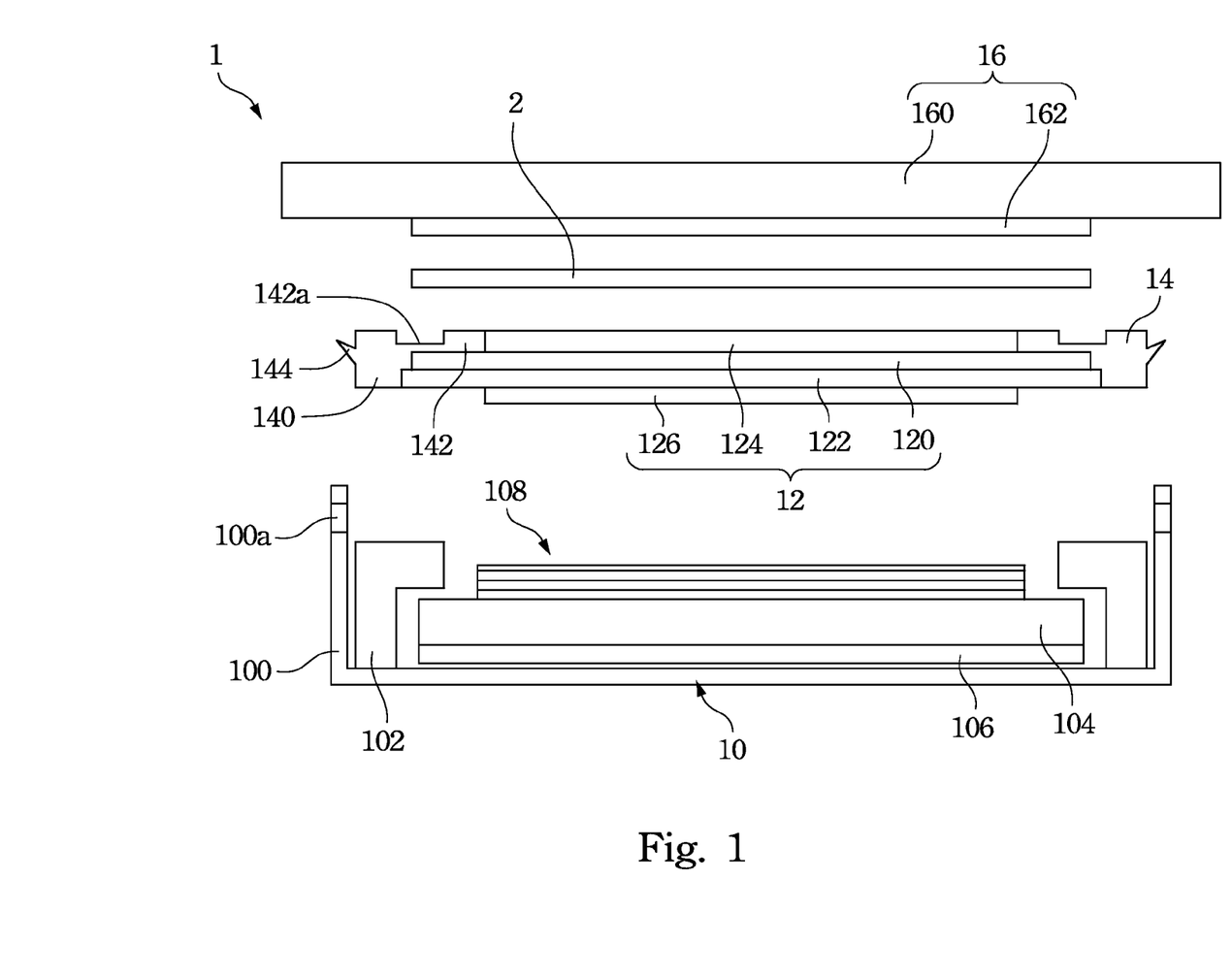
FIG. 1 is a cross-sectional exploded view of a display apparatus according to an embodiment of the invention.
Figure 2:
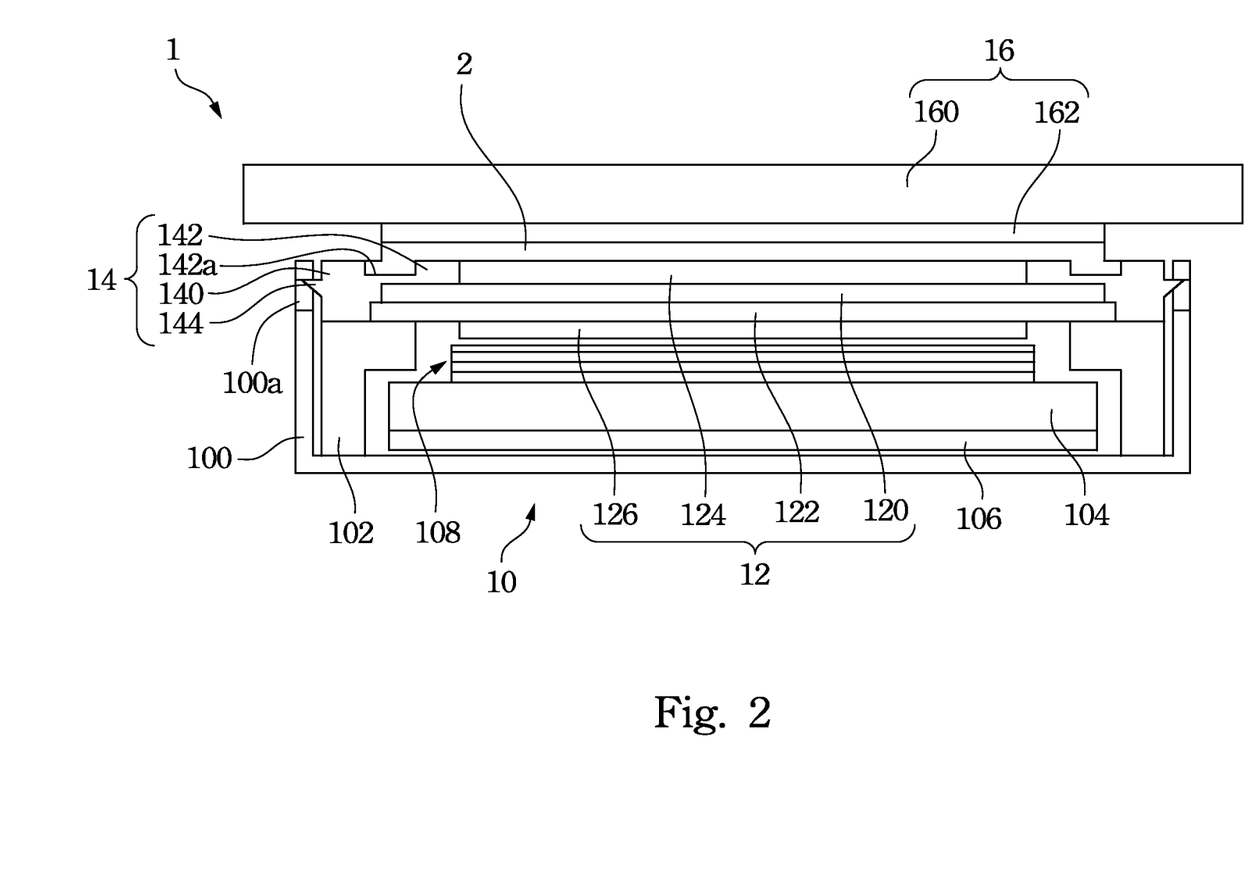
FIG. 2 is a cross-sectional assembled view of the display apparatus in FIG. 1.

FIG. 1 is a cross-sectional exploded view of a display apparatus 1 according to an embodiment of the invention. FIG. 2 is a cross-sectional assembled view of the display apparatus 1 in FIG. 1.

As shown in FIG. 1 and FIG. 2, the electronic apparatus applicable to the display apparatus 1 of the invention can be a portable computer device (e.g., a notebook computer, a tablet computer, etc.) or a portable electronic product (e.g., a PDA, a mobile phone, a game console, etc.), but the invention is not limited in this regard. That is, the electronic apparatus applicable to the display apparatus 1 of the invention can be any electronic product with a display function. As long as there is a requirement of preventing the overflow glue problem from occurring during the process of directly bonding the inner components of the display apparatus 1, the concepts of the invention can be applied to the assembling the display apparatus 1.

As shown in FIG. 1 and FIG. 2, the display apparatus 1 of the invention includes a backlight module 10, a frame 100, a bezel 102, a panel module 12, an assembly member 14, and a touch module 16. The backlight module 10 of the display apparatus 1 includes a light source (not shown), a light guide plate 104, a reflector 106, and optical films 108. An outer edge of the bezel 102 of the display apparatus 1 is assembled to an interior wall of the frame 100, and the frame 100 surrounds a periphery of the panel module 12. The light guide plate 104 of the backlight module 10 is disposed on the reflector 106, and the frame 102 under the reflector 106 supports an edge of the reflector 106. The light source of the backlight module 10 can be disposed on the frame 100 and resist against a side of the light guide plate 104.

In the embodiment, the light source of the backlight module 10 can be a CCFL (Cold-Cathode Fluorescent Lamp) or a LED (Light-Emitting Diode), but the invention is not limited thereto. The optical films 108 of the backlight module 10 may include a diffusing layer, a BEF (Brightness Enhancement Film), a prism layer, etc., and are disposed on the light guide plate 104. The bezel 102 of the display apparatus 1 under the panel module 12 supports the edge of the panel module 12. The panel module 12 of the display apparatus 1 includes a substrate assembly, a polarizer 124, and polarizer 126. The substrate assembly of the panel module 12 includes a color filter substrate 120 and a TFT (Thin-Film Transistor) substrate 122. The color filter substrate 120 and the TFT substrate 122 of the panel module 12 are laminated to each other. The polarizer 124 of the panel module 12 is laminated on the color filter substrate 120. The polarizer 126 of the panel module 12 is laminated under the TFT substrate 122. Under the configurations, the light emitted by the light source of the backlight module 10 can enter the light guide plate 104, and be reflected by the reflector 106 to subsequently pass through the optical films 108, the polarizer 126, the TFT substrate 122, the color filter substrate 120, and the polarizer 124, and then leave the panel module 12, thereby achieving the function of display for users.

As shown in FIG. 1 and FIG. 2, the display apparatus 1 of the invention further includes a glue layer 2. The assembly member 14 of the display apparatus 1 is engaged with a sidewall of the panel module 12. The glue layer 2 of the display apparatus 1 is disposed on the panel module 12 and at least one portion of the glue layer 2 is disposed on the assembly member 14. The touch module 16 of the display apparatus 1 is disposed on the glue layer 2. The panel module 12 and the assembly member 14 of the display apparatus 1 are adhered to a side of the glue layer 2 (i.e., the lower side of the glue layer 2). The touch module 16 of the display apparatus 1 is adhered to another side of the glue layer opposite to the side of the glue layer (i.e., the upper side of the glue layer 2).

Furthermore, the assembly member 14 of the display apparatus 1 further includes an engaging body 140 and an adhering portion 142. The engaging body 140 of the assembly member 14 is engaged with a sidewall of the substrate assembly of the panel module 12 (i.e., the sidewall of the color filter substrate 120 and that of the TFT substrate 122). The adhering portion 142 of the assembly member 14 extends from the engaging body 140 to an area between the touch module 16 and the panel module 12. That is, the polarizer 124 of the panel module 12 and the at least one portion of the adhering portion 142 of the assembly member 14 are adhered at the lower side of the glue layer 2. In addition, the touch module 16 of the display apparatus 1 further includes a cover plate 160 and a touch-sensing layer 162. The touch-sensing layer 162 of the touch module 16 is disposed under the cover plate 160. In one case, the touch-sensing layer 162 of the touch module 16 can be disposed under the cover plate 160 by using a coating process. In another case, the touch-sensing layer 162 of the touch module 16 is a substrate and can be laminated under the cover plate 160. The touch-sensing layer 162 of the touch module 16 is adhered to the opposite side (i.e., the upper side) of the glue layer 2. Therefore, the panel module 12 and the assembly member 14 that have been assembled can be directly bonded to the touch module 16 respectively from the lower side and the upper side of the glue layer 2.

As shown in FIG. 1 and FIG. 2, in order to prevent the glue layer 2 that is not yet cured from being compressed to overflow when the assembly member 14 and the panel module 12 are directly bonded to the touch module 16, the adhering portion 142 of the assembly member 14 can further include at least one recess 142a that is concaved on the adhering portion 142. After the adhering portion 142, the panel module 12, and the touch module 16 are directly bonded to each other via the glue layer 2, the recess 142a of the adhering portion 142 can accommodate the overflow portion of the glue layer 2. In the embodiment, the recess 142a of the adhering portion 142 is substantially aligned with an edge of the touch-sensing layer 162 of the touch module 16. In order to achieve the purposes of accommodating the overflow portion of the glue layer 2 and expelling air out of the glue layer 2, the recess 142a of the adhering portion 142 is partially located under the touch-sensing layer 162 of the touch module 16 and partially extended outward relative to the edge of the touch-sensing layer 162. In other words, when the assembly member 14 assists the panel module 12 to be directly bonded to the touch module 16, the recess 142a of the adhering portion 142 is not entirely covered under the touch-sensing layer 162 of the touch module 16, so that the glue layer 2 can expel air through the overflowing part accommodated in the recess 142a.

In addition, in order to enable the overflow portion of the glue layer 2 to smoothly flow into the recess 142a of the adhering portion 142 when the assembly member 14 is used to assist the panel module 12 to be directly bonded to the touch module 16, the adhering portion 142 of the assembly member 14 and the polarizer 124 substantially have the same thickness, but the invention is not limited thereto.

Figure 3:
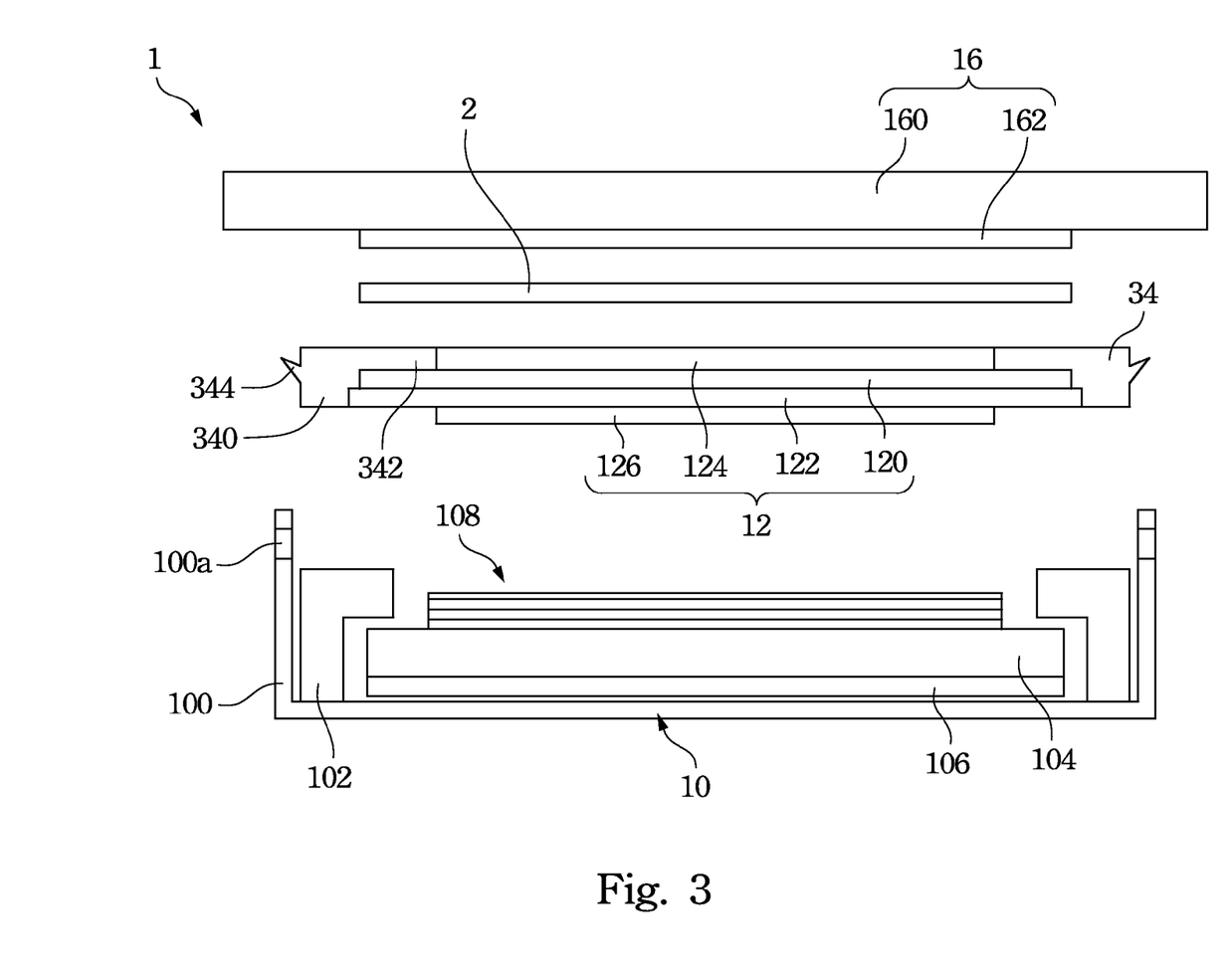
FIG. 3 is a cross-sectional exploded view of a display apparatus according to another embodiment of the invention.
Figure 4:
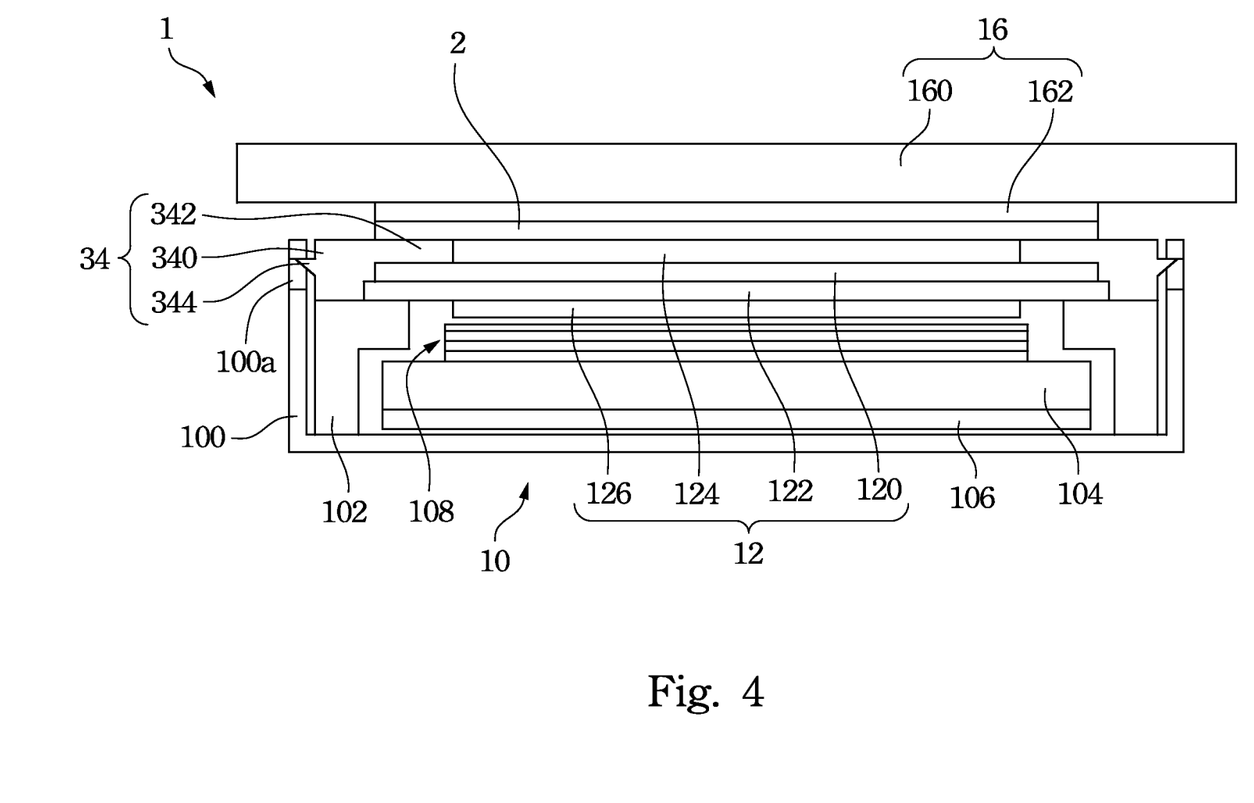
FIG. 4 is a cross-sectional assembled view of the display apparatus in FIG. 3.

FIG. 3 is a cross-sectional exploded view of a display apparatus 1 according to another embodiment of the invention. FIG. 4 is a cross-sectional assembled view of the display apparatus 1 in FIG. 3.

As shown in FIG. 3 and FIG. 4, the display apparatus 1 also includes a backlight module 10, a frame 100, a bezel 102, a panel module 12, a touch module 16, and a glue layer 2, and those components are not described again herein. In the embodiment, an assembly member 34 includes an engaging body 340, an adhering portion 342, and hooks 344. The engaging body 340 of the assembly member 34 is engaged with a sidewall of the substrate assembly of the panel module 12. The adhering portion 342 of the assembly member 34 is adhered to the lower side of the glue layer 2. Each of the hooks 344 of the assembly member 34 is engaged with a corresponding lock portion 100a of the frame 100. However, the assembly member 34 does not include the recess 142a in FIG. 1 and FIG. 2. That is, if the overflow glue problem is not considered when the panel module 12 is directly bonded to the touch module 16 and assembled to the backlight module 10, the assembly member 34 of the embodiment can omit the recess 142a in FIG. 1 and FIG. 2.

As shown in FIG. 1 and FIG. 2, the frame 100 of the display apparatus 1 includes at least one lock portion 100a. The assembly member 14 includes at least one hook 144 located at the periphery of the assembly member 14. The lock portion 100a of the frame 100 and the hook 144 of the assembly 14 are suitable to be engaged with each other. Therefore, after being directly bonded to the touch module 16 with the assistance of the assembly member 14, the panel module 12 can be further assembled to the frame 100 by directly engaging the hook 144 of the assembly member 14 with the lock portion 100a of the frame 100, such that the convent module 10 by a cell tape can be replaced. The assembly member 14 not only can be assembled to the sidewall of the panel module 12, but also can be adhered to the panel module 12. Furthermore, the panel module 12 and the assembly member 14 that have already assembled to each other can be mounted to the bezel 102 by adhering or screw-fastening, etc.

It can be seen that the assembling processes of the display apparatus 1 of the invention substantially includes following steps: (1) assembling the assembly member 14 to the sidewall of the panel module 12; (2) directly bonding the panel module 12 that has been already assembled with the assembly member 14 to the touch module 16 by the glue layer 2; and (3) engaging the panel module 12 that has been already directly bonded to the touch module 16 and the assembly member 14 with the frame 100 or be adhered to the bezel 102. However, the assembling processes of the display apparatus 1 of the invention are not limited thereto.

Figure 5:
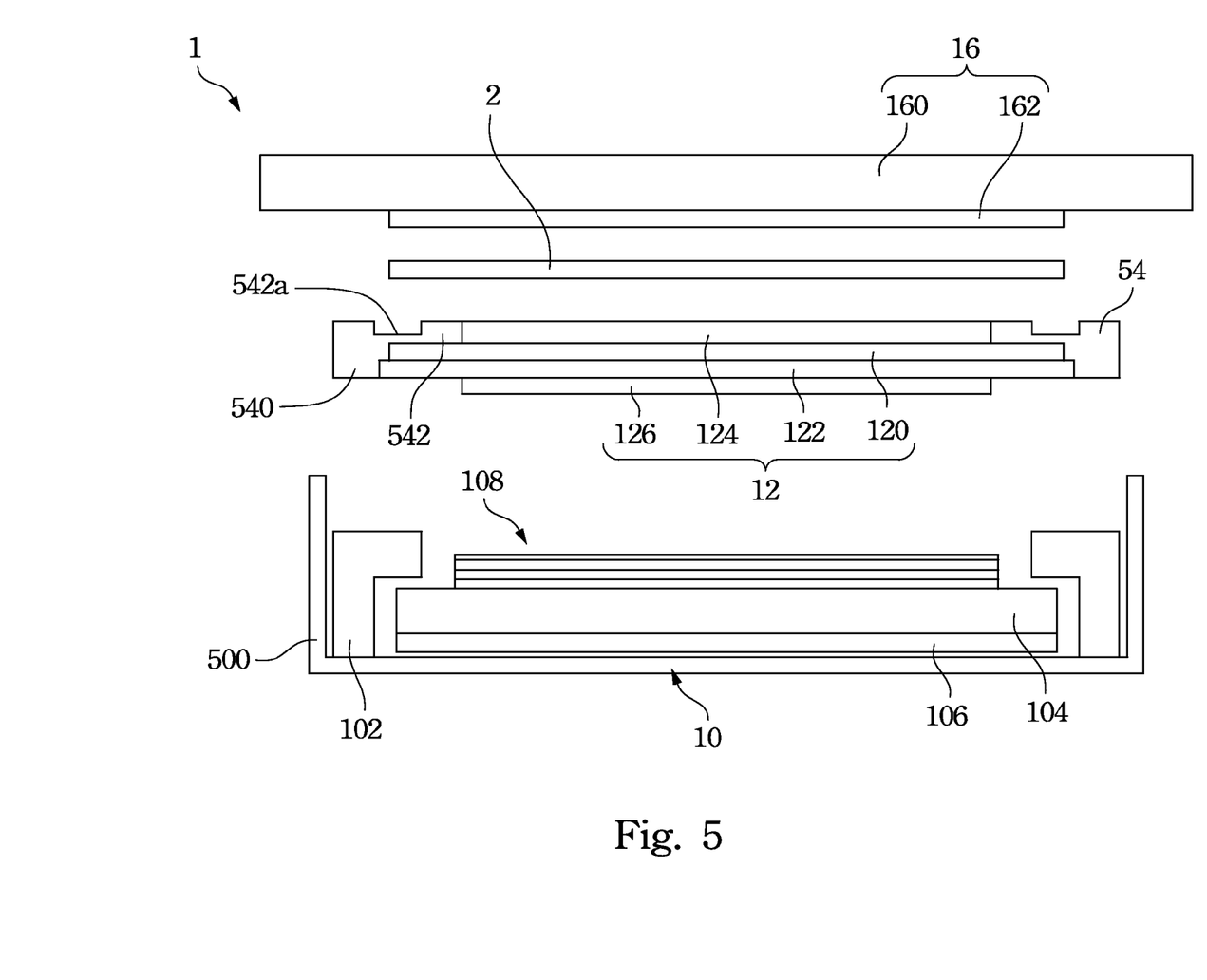
FIG. 5 is a cross-sectional exploded view of a display apparatus according to another embodiment of the invention.
Figure 6:
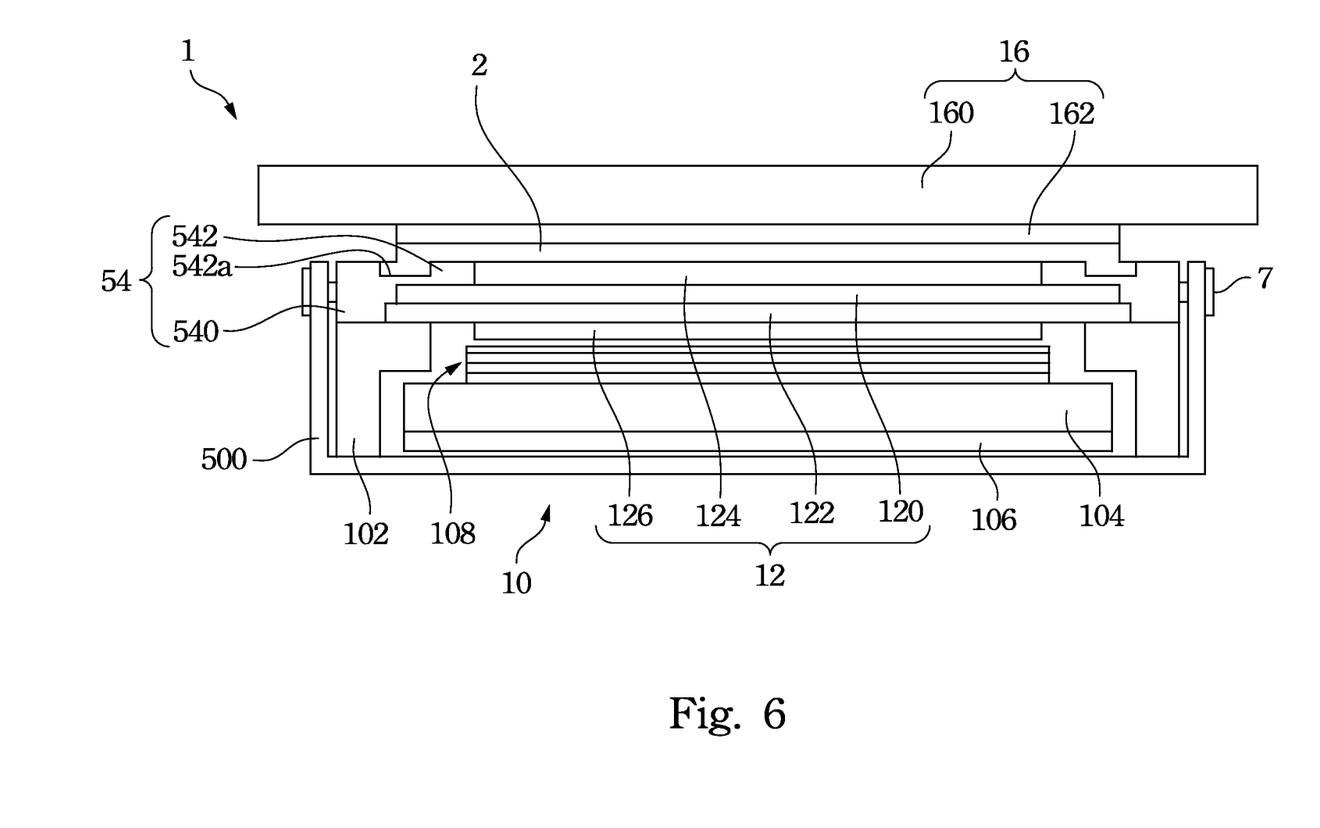
FIG. 6 is a cross-sectional assembled view of the display apparatus in FIG. 5.

FIG. 5 is a cross-sectional exploded view of a display apparatus 1 according to another embodiment of the invention. FIG. 6 is a cross-sectional assembled view of the display apparatus 1 in FIG. 5.

As shown in FIG. 5 and FIG. 6, the display apparatus 1 also includes a backlight module 10, a frame 100, a bezel 102, a panel module 12, a touch module 16, and a glue layer 2, and those components are not described again herein. In the embodiment, the frame 500 of the embodiment does not include the lock portion 100a in FIG. 1 and FIG. 2. The assembly member 54 of the embodiment includes an engaging body 540 that is engaged with a sidewall of the substrate assembly of the panel module 12, an adhering portion 542 that is adhered to the lower side of the glue layer 2, and a recess 542a that accommodates the overflow portion of the glue layer 2 without the hook 144 in FIG. 1 and FIG. 2. Therefore, in the embodiment, the panel module 12 and the assembly member 54 that have been assembled to each other are mounted to the bezel 102 by adhering, but the invention is not limited thereto. Moreover, the display apparatus 1 of the embodiment can further include a screw 7 for fastening the frame 500 of the display apparatus 1 to the engaging body 540 of the assembly member 54, but the invention is not limited thereto.

In another embodiment, the screw 7 can also be used to fasten the engaging body 540 of the assembly member 54 to the bezel 102 of the display apparatus 1, and the assembly member 54 can be mounted to the frame 500 by adhering.

Furthermore, in order to solve the problem that the overflow portion of the glue layer 2 fails to be exposed to curing light (e.g., ultraviolet light) and thus cannot be cured due to the sheltering of a conventional cell tap (not shown), in one embodiment, the assembly member 14 of the display apparatus 1 can be a light-pervious element. Therefore, when the curing light is emitted upward from the bottom of the backlight module 10 of the display apparatus 1, the light-pervious assembly member 14 allows the hardening light to pass through, such that the overflow portion of the glue layer 2 that is located at the adhering portion 142 of the assembly member 14 can be cured.

According to the foregoing recitations of the embodiments of the invention, it can be seen that a particularly designed assembly member can be firstly assembled to a panel module of a display apparatus, and provides assistances when the panel module is directly bonded to a touch module and assembled to a backlight module of the display apparatus. Particularly, the assembly member of the invention has a design of preventing overflow glue problem and a design of expelling air. Therefore, when the panel module accompanied with the assembly member is directly bonded to the touch module, the overflow glue problem caused by a glue layer compressed between the panel module and the touch module can be controlled, such that the lighting performance of the display apparatus is not affected. Furthermore, hooks are designed at the outer edge of the assembly member in the invention, such that the panel module can be assembled to a frame of the backlight module by engaging the hooks with the frame. Therefore, the conventional approach of mounting the panel module and the backlight module by a cell tape can be replaced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display apparatus comprising:
    a panel module;
    an assembly member engaged with a sidewall of the panel module, wherein a top surface of said assembly module is coplanar to a top surface of said panel module and a side surface of said assembly module is directly in contact with a side surface of said panel module;
    a glue layer disposed on the panel module, wherein at least one portion of the glue layer is disposed on the assembly member; and
    a touch module disposed on the glue layer;
    wherein the top surface of said panel module and the top surface of said assembly member are adhered to a first side of the glue layer, the touch module comprises a touch-sensing layer, and the touch-sensing layer is adhered to a second side of the glue layer opposite to the first side, and wherein the assembly member comprises an adhering portion located between the touch module and the panel module, the adhering portion comprises at least one recess, an image of the outermost edge of the touch sensing layer projected in a direction normal to the touch sensing layer onto the adhering portion falls on an edge of or within the recess, the top surface of said assembly member comprises two top-facing portions on either side of the recess, and the top-facing portions are coplanar.

2. The display apparatus of claim 1, wherein the assembly member further comprises:
    an engaging body engaged with the sidewall of the panel module;
    wherein the adhering portion extending from the engaging body to an area between the touch module and the panel module, and at least one portion of the adhering portion of the assembly member is adhered to the first side of the glue layer.

3. The display apparatus of claim 2, wherein the panel module further comprises:
    a substrate assembly, wherein the engaging body is engaged with a sidewall of the substrate assembly; and
    a polarizer laminated on the substrate assembly, wherein the adhering portion resists against an outer edge of the polarizer, and the polarizer of the panel module is adhered to the first side of the glue layer.

4. The display apparatus of claim 3, wherein the adhering portion and the polarizer substantially have the same thickness.

5. The display apparatus of claim 1, wherein the touch module further comprises:
    a cover plate;
    wherein the touch-sensing layer disposed under the cover plate.

6. The display apparatus of claim 1, further comprising a frame, the frame comprising at least one lock portion, the assembly member comprising at least one hook engaged with the lock portion.

7. The display apparatus of claim 1, further comprising:
    a frame; and
    a bezel assembled to an interior wall of the frame, wherein the panel module and the assembly member are mounted on the bezel.

8. The display apparatus of claim 7, further comprising a backlight module mounted on the frame, wherein the bezel surrounds a sidewall of the backlight module, and the backlight module is located between the panel module and the frame.

9. The display apparatus of claim 7, wherein the assembly member is mounted to an interior wall of the frame.

10. The display apparatus of claim 1, wherein the assembly member is a light-pervious element.

* * * * *